(12) United States Patent
Osteen

(10) Patent No.: US 8,109,295 B2
(45) Date of Patent: Feb. 7, 2012

(54) MANIFOLD ASSEMBLY

(75) Inventor: William Clinton Osteen, Hartselle, AL (US)

(73) Assignee: Tyco Valves & Controls LP, Houston, TX (US)

( * ) Notice: Subject to any disclaimer, the term of this patent is extended or adjusted under 35 U.S.C. 154(b) by 560 days.

(21) Appl. No.: 12/257,997

(22) Filed: Oct. 24, 2008

(65) Prior Publication Data

US 2010/0101671 A1    Apr. 29, 2010

(51) Int. Cl.
F16K 11/10    (2006.01)

(52) U.S. Cl. .......................................... 137/881; 55/311

(58) Field of Classification Search ................... 137/588, 137/597, 877, 878, 881; 55/311
See application file for complete search history.

(56) References Cited

U.S. PATENT DOCUMENTS

| | | | | |
|---|---|---|---|---|
| 3,390,514 A | * | 7/1968 | Raschke | ........................ 96/421 |
| 4,576,616 A | * | 3/1986 | Mottram et al. | ................... 95/96 |
| 4,747,853 A | * | 5/1988 | Haslett et al. | ..................... 95/22 |
| 4,773,446 A | * | 9/1988 | Farnsworth et al. | .......... 137/606 |
| 4,936,297 A | * | 6/1990 | Greiff et al. | .............. 128/203.25 |
| 5,071,453 A | * | 12/1991 | Hradek et al. | ................... 96/111 |
| 5,988,165 A | * | 11/1999 | Richey et al. | ............. 128/205.12 |
| 6,340,034 B1 | | 1/2002 | Arnott et al. | |
| 6,386,235 B1 | * | 5/2002 | McCulloh et al. | ............ 137/881 |
| 6,681,764 B1 | * | 1/2004 | Honkonen et al. | ....... 128/201.21 |
| 6,766,829 B2 | * | 7/2004 | Takeda et al. | ................. 137/877 |
| 6,929,028 B2 | * | 8/2005 | Larsen et al. | ................. 137/613 |
| 2005/0247359 A1 | | 11/2005 | Hiser | |
| 2007/0056643 A1 | | 3/2007 | Larsen et al. | |

FOREIGN PATENT DOCUMENTS

WO    2005/096695 A2    10/2005

* cited by examiner

Primary Examiner — John Fox

(57) ABSTRACT

A manifold assembly used to control the flow of oxygen in an oxygen concentrator system The manifold assembly provides a series of internal pathways which receive a primary and secondary relief valves via external orifices. The manifold reduces the number of component connections and potential leak paths for control and monitoring of process media.

11 Claims, 3 Drawing Sheets

MANIFOLD ASSEMBLY

BACKGROUND OF THE INVENTION

1. Field of the Invention

Embodiments of the invention relate to the field of process flow manifolds. More particularly, embodiments of the invention are directed to a manifold used to regulate process flow which reduces potential leak paths while providing easy connection assembly.

2. Discussion of Related Art

Oxygen concentrators utilize a process by which oxygen is separated from ambient air and stored either as a gas or in liquid form. One method used to separate oxygen from air is through the use of pressure swing absorption systems. These systems utilize molecular sieve beds for separating the ambient air gas mixture into a nitrogen component and an oxygen component. The gas or liquid is then stored under pressure requiring the need for various pressure relief and check valves to ensure that pressure within such a system does not exceed hazardous levels. Regardless of the method used to obtain concentrated oxygen, leaks between various components including storage media must be minimized. In addition, many oxygen concentrators are portable such that an ambulatory patient carries or roles an oxygen tank from which a flow of oxygen is supplied.

As noted above, oxygen concentrator systems utilize a series of connector assemblies and valves to direct, store and release oxygen to a patient. Typically, these components are discrete and require attachment to one another using, for example, threaded connections and Teflon® tape. The more discrete components utilized, the longer it takes to assemble the system, the more space required to house the components, and the higher the number of potential leak paths. In addition, mobile oxygen concentrators are susceptible to collisions which may damage these connector assemblies and components thereby jeopardizing the integrity of the stored oxygen. Generally, the more components employed in such assemblies the more connections required and the more testing required to ensure against leaks. Thus, there is a need for a gas flow subassembly used in an oxygen concentrator that is compact and easy to assemble with limited leak path potential.

SUMMARY OF THE INVENTION

Exemplary embodiments of the present invention are directed to a manifold assembly. In an exemplary embodiment, the manifold assembly accommodate the flow of process media to and from a storage container. The manifold assembly includes a manifold body having a plurality of orifices. A plurality of pathways are disposed within the body where each of the pathways is associated with at least one of said orifices. A primary relief valve assembly is mounted within a first of the plurality of orifices. The relief valve assembly is associated with a first one of the pathways within the manifold body. A solenoid valve is mounted in a third of the plurality of orifices associated with a third one of the pathways within the manifold body. The solenoid valve controls the flow of media to the storage container. A secondary relief valve assembly is mounted within a second of the plurality of orifices and is associated with a second one of the pathways within the manifold body. The said secondary relief valve provides relief of the process media to the storage container via the solenoid valve.

DESCRIPTION OF EMBODIMENTS

Figure 1:
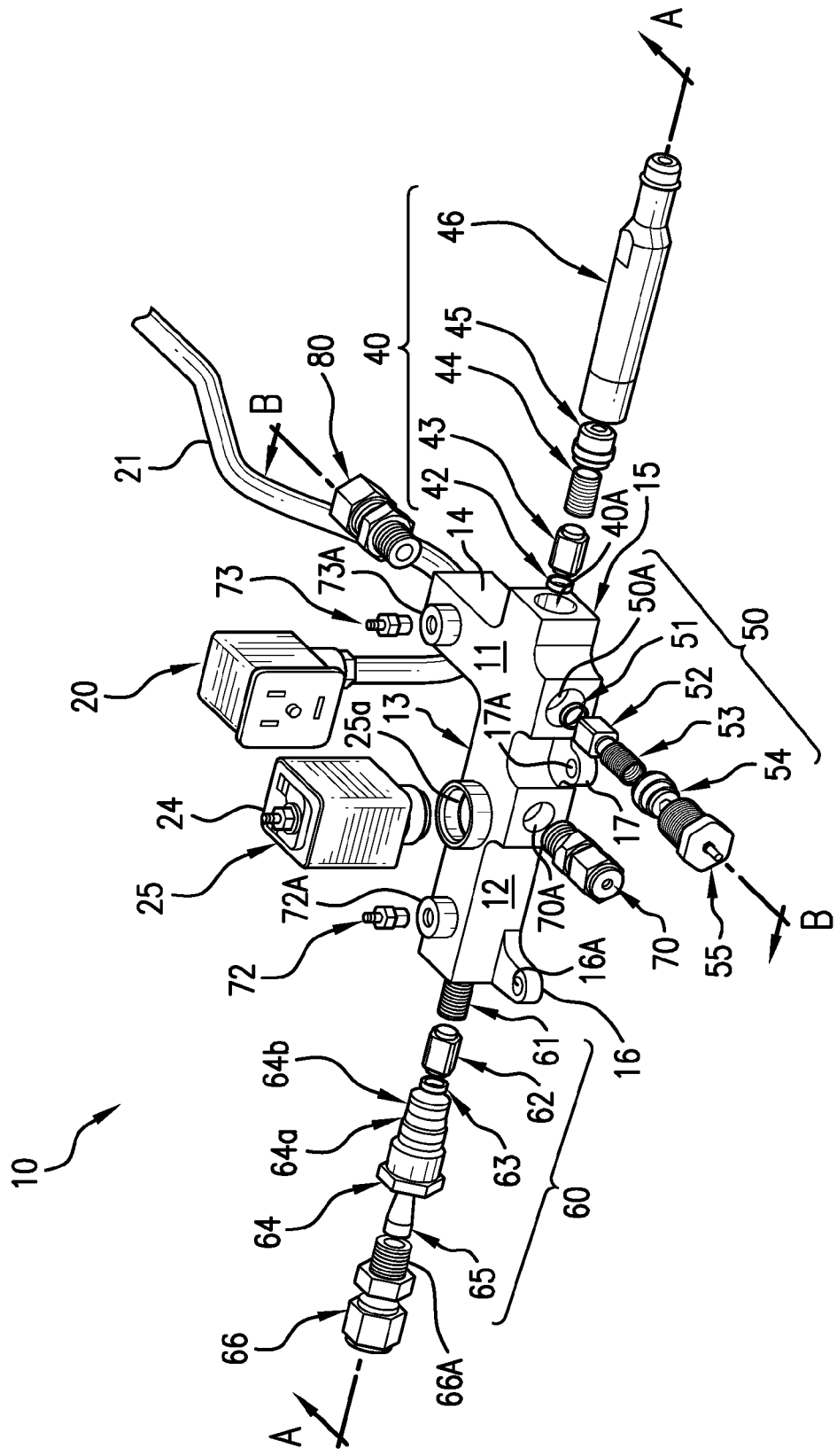
FIG. 1 is a perspective view of a manifold assembly in accordance with the present invention.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 is a perspective view of a manifold assembly 10 having a housing or body 15 with a plurality of orifices as described below. The body 15 is configured to receive a plurality of valves and fittings and provides a contained pathway system within the manifold to connect various orifices, pathways and devices. In this manner, a plurality of connections between various primary and secondary relief valves as well as multiple leak path connections between components within an oxygen concentrator system is avoided.

Manifold body 15 is defined by a top surface 11, first side wall 12, opposing side wall 13 (shown in FIG. 3), end wall 14 and opposing end wall 14A. Mounting plates 16 and 17 having respective mounting bores 16A and 17A are used to retain the manifold in a desired position. The interior of manifold body 15 has a plurality of pathways to connect various components thereby reducing the number of leak path opportunities there between. Generally, solenoid valve 25 is mounted in orifice 25a which extends into body 15 from top surface 11 to control the flow of process media, for example gaseous oxygen to the various components. Solenoid 25 may be a three (3) way valve which provides connection paths between connector assembly 60, fitting assembly 70, bleed line 24 and relief valve 40. Solenoid valve 25 may be a typical solenoid which includes a wire coil that opens and closes a mechanical valve based on the application of electric current. In this configuration, electric power is supplied by wiring harness 20 via power cable attachment 21. As will be described in more detail below, the path from connection assembly 60 through solenoid valve 25 connects the path from connection assembly 60 to bleed line 24, fitting assembly 70 and secondary relief valve 40. Solenoid valve 25 also controls the connection of fitting assembly 70 to a cryostat storage container via orifice 70A.

A check valve is defined by spring 61, piston 62, seal 63 and inlet fitting 64. Connector assembly 60 includes this check valve as well as filter 65 and compression fitting 66. Connector assembly 60 is disposed within a pathway of manifold 15 and connected to a media storage tank via compression fitting 66. Check valve 62 prevents media from flowing back toward this media storage tank. The process media for this particular manifold 15 is gaseous oxygen, but alternative media forms may also be accommodated. Orifice 72a receives fitting 72 which is used to vent unwanted media away from connector assembly 60, extends through manifold body 15 and aligns with an outlet of threaded portion 66a of fitting 66.

Generally, there are two (2) pressure relief valve assemblies 40 and 50 disposed within manifold body 15 via orifices 40A and 50A respectively. Pressure relief valve assembly 40 is a secondary relief valve and is defined by seal 42, piston 43, spring 44, spring chamber 45 and diffuser 46 and is disposed within manifold body 15 via orifice 40A. Valve assembly 40 may be normally in a shut position where set spring 44 and spring chamber 45 provide a relief path at pressure values based on a particular application. Secondary relief valve assembly 40 provides a connection with solenoid valve 25 and the input to a cryostat storage container via fitting assembly 70. Relief valve assembly 50 is the primary relief valve and is disposed within manifold body 15 via orifice 50a. Primary relief valve assembly 50 is defined by seal 51, piston 52, spring 53, spring chamber 54 and fitting 55. Primary relief valve assembly 50 may set spring 53 and spring chamber 54 to a particular psi rating depending on the particular application. Primary relief valve assembly 50 provides connections through manifold body 15 between connector assembly 80 from the cryostat storage container and vent fitting 73 via orifice 73A. The vent fitting 73 may be used to provide pressure information related to the cryostat storage tank connected between fitting assemblies 70 and 80. In this manner, primary relief valve assembly 50 and secondary relief valve assembly 40 may be configured with various pressure ratings. However, by way of example only, in an oxygen concentrator application where oxygen is separated from ambient air, liquefied and stored, primary pressure relief valve assembly 50 may be set between to 20 to 30 psi and secondary pressure relief valve assembly 4—may be set between 30 to 40 psi.

Figure 2:
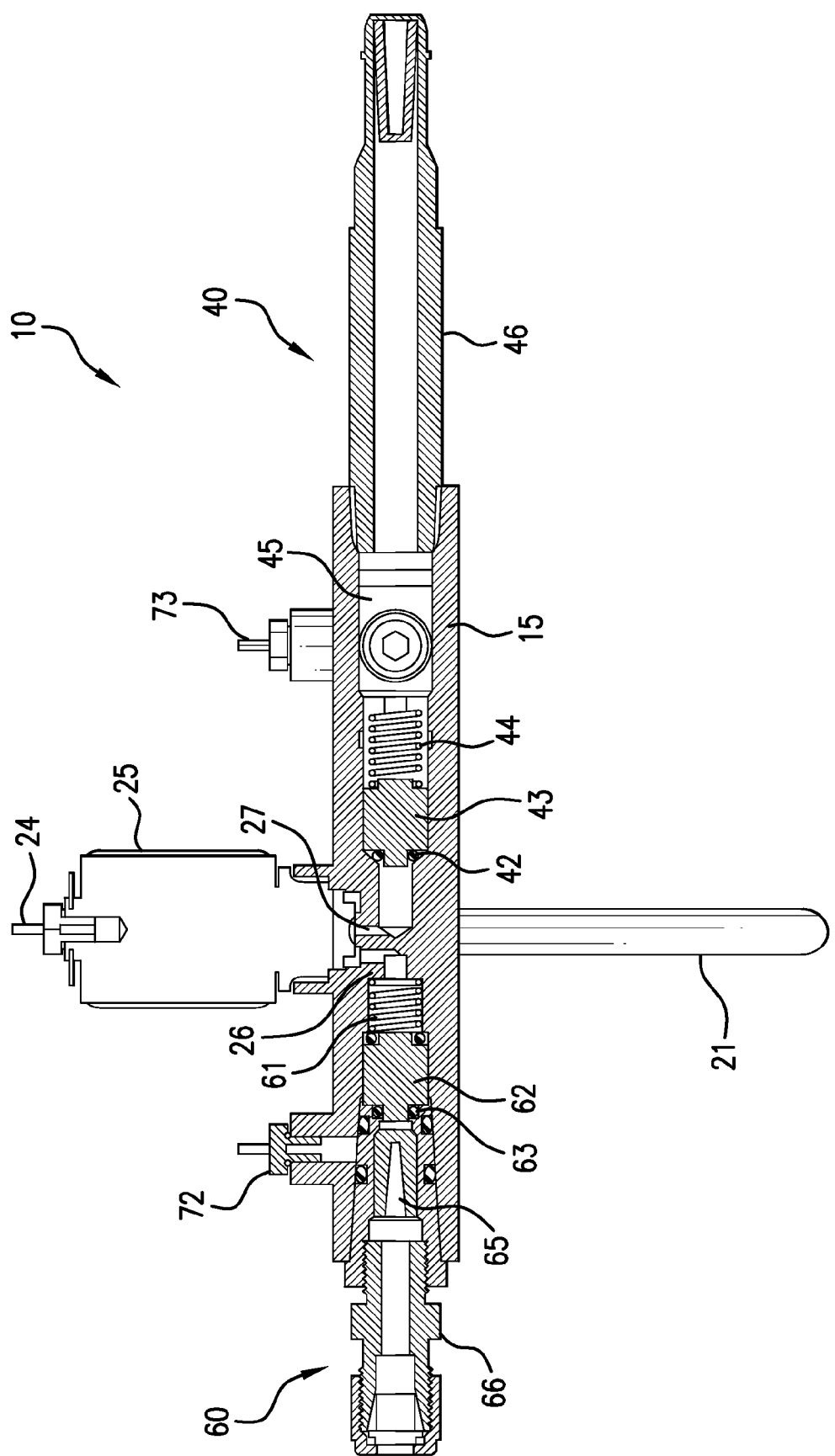
FIG. 2 is a cut away cross sectional view taken along lines A-A of the manifold assembly shown in FIG. 1 with components positioned within their respective pathways in accordance with the present invention.

FIG. 2 is a cut away side view of manifold assembly 10 taken along lines A-A illustrating the placement of connector assembly 60 and secondary relief valve 40 within manifold body 15. Solenoid valve 25 has an inlet 26 and outlet 27 which extend downward from the top surface 11 of manifold body 15. Inlet 26 and outlet 27 provide a connection between connector assembly 60 and first relief valve assembly 40. In addition, bleed line 24 located on the top portion of solenoid 25 provides a connection between connector assembly 60 and an external vent which may be, for example, ambient air or tied back to primary relief valve 50 via fitting 55. In particular, inlet 26 provides a pathway connection with connector assembly 60 and solenoid valve 25 and outlet 27 provides a pathway connection with solenoid valve 25 and secondary relief valve assembly 40. As mentioned earlier, the check valve within connector assembly 60 prevents reverse flow of gas away from solenoid 25. When wiring harness 20 supplies power to solenoid valve 25, the solenoid valve either opens or closes. Solenoid valve 25 may provide a relief pathway formed from connector assembly 60 to secondary relief valve 40. Solenoid valve may provide a relief path between connector assembly 60 and fitting assembly 70. Similarly, solenoid valve may provide a relief path between connector assembly 60, bleed line 24 and secondary relief valve 40.

Figure 3:
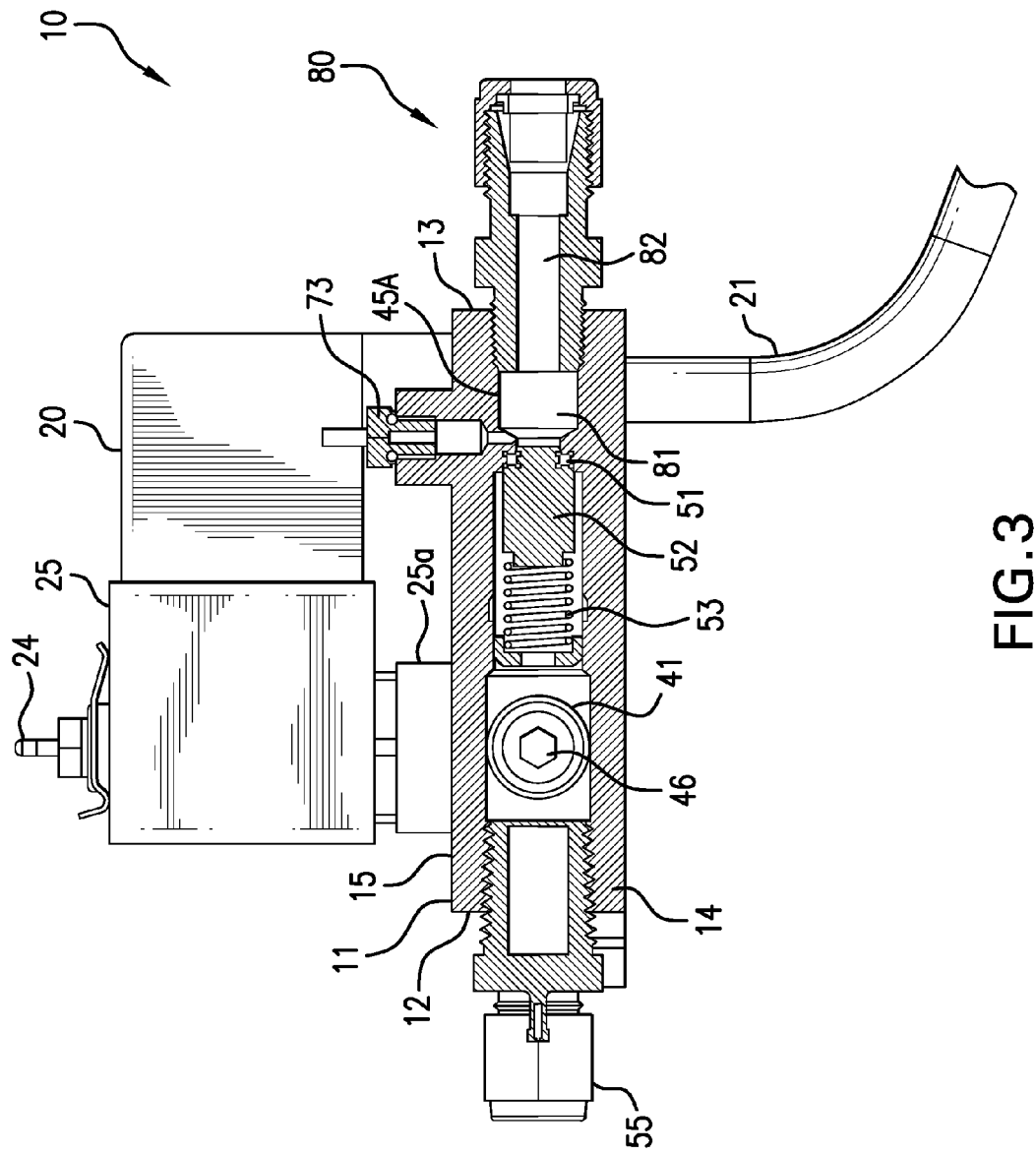
FIG. 3 illustrates cut away cross sectional view taken along lines B-B of the manifold assembly shown in FIG. 1 with components positioned within their respective pathways in accordance with the present invention.

FIG. 3 is a cut away cross sectional view taken along lines B-B of manifold body 15 shown in FIG. 1 with the various components positioned within their respective pathways in accordance with the present invention. As described earlier, fitting assembly 80 is connected to a cryostat storage tank at one end and to primary relief valve 50 at the other end through manifold body 15. Orifice 73a receives vent fitting 73 which is used to vent a portion of gas away from fitting assembly 80. Vent fitting assembly 73 extends through manifold body 15 from top surface 11 and aligns with an outlet 45A of spring chamber 45. Vent fitting 73 supplies gaseous media to an external sensor which is used to provide measuring and monitoring information associated with the condition of the cryostat tank. A connection is formed within the pathways of manifold body 15 between primary relief valve 50 and fitting assembly 80. In particular, quad ring 51 is disposed between piston 52 and first end 81 of assembly 80. A channel 82 provides a connection from the cryostat tank through fitting 80 to primary relief valve 50. In this manner, increased pressure detected from the cryostat tank and measured from vent fitting 73 may be supplied to primary relief valve 50 and vented externally.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A manifold assembly to accommodate the flow of process media to and from a storage container, said manifold assembly comprising:
   a manifold body having a plurality of orifices;
   a plurality of pathways disposed within said body, each of said pathways associated with at least one of said orifices;
   a primary relief valve assembly mounted within a first of said plurality of orifices, said relief valve assembly associated with a first one of said pathways within said manifold body;
   a solenoid valve mounted in a second of said plurality of orifices associated with a second one of said pathways within said manifold body, said solenoid valve controlling the flow of media to said storage container; and
   a secondary relief valve assembly mounted within a third of said plurality of orifices, said secondary relief valve assembly associated with a third one of said pathways within said manifold body; said secondary relief valve providing relief of said process media to said storage container via said solenoid valve.

2. The manifold assembly of claim 1 further comprising a check valve mounted within a fourth of said plurality of orifices connected to said second one of said pathways providing a path between said check valve and said solenoid valve, said check valve configured to prevent the flow of process media away from said solenoid valve.

3. The manifold assembly of claim 2 further comprising a fifth pathway connecting said solenoid valve to a process media bleed line.

4. The manifold assembly of claim 2 wherein said check valve is defined by a piston, disposed between a spring and a seal, and an inlet fitting connected to an inlet port.

5. The manifold assembly of claim 1 wherein said secondary relief valve assembly is defined by a seal disposed within said third one of said pathways within said manifold body, a piston disposed between said seal and a spring, a diffuser connected to an external vent and a spring chamber disposed between said diffuser and said piston and configured to house said spring.

6. The manifold assembly of claim 1 wherein said secondary valve assembly is in a normally closed position and configured to provide a relief path from said storage container at particular pressure levels.

7. The manifold assembly of claim 1 wherein said primary relief valve assembly is defined by a seal disposed within said first one of said pathways within said manifold body, a piston disposed between said seal and a spring, a spring chamber configured to house said spring and a fitting to accommodate an external vent port.

8. The manifold assembly of claim 1 further comprising a vent disposed between said storage container and said primary relief valve assembly, said vent configured to accommodate a pressure value of said process media associated with said storage container.

9. The manifold assembly of claim 1 further comprising a wiring harness connected to said solenoid valve, said wiring harness configured to accommodate power wires to supply power to said solenoid valve to open and close said solenoid valve.

10. The manifold assembly of claim 1 further comprising a fitting assembly connected between said storage container and said primary relief valve assembly.

11. The manifold assembly of claim 10 wherein said fitting assembly further comprises a channel which provides said connection between said storage container and said primary relief valve assembly.

* * * * *